United States Patent [19]

Okamura et al.

[11] Patent Number: 5,299,276
[45] Date of Patent: Mar. 29, 1994

[54] WAVEGUIDE TYPE OPTICAL DEVICE AND METHOD FOR MANUFACTURING THE SAME

[75] Inventors: Koji Okamura; Tadao Arima, both of Kawasaki, Japan

[73] Assignee: Fujitsu Limited, Kawasaki, Japan

[21] Appl. No.: 958,975

[22] Filed: Oct. 9, 1992

[30] Foreign Application Priority Data

Oct. 11, 1991 [JP] Japan ................................. 3-263633
Oct. 11, 1991 [JP] Japan ................................. 3-263634

[51] Int. Cl.⁵ .................................................. G02B 6/10
[52] U.S. Cl. ...................................... 385/130; 385/49; 385/129; 65/3.1
[58] Field of Search ................ 385/129, 130, 131, 132, 385/49; 65/3.1, 3.11, 3.15, 18.2, 3.14

[56] References Cited

U.S. PATENT DOCUMENTS

| 3,880,630 | 4/1975 | Izawa ........................... 385/129 X |
| 4,712,855 | 12/1987 | Tolksdorf et al. ................ 385/129 |
| 4,812,005 | 3/1989 | Heywang ....................... 385/49 X |
| 4,812,153 | 3/1989 | Andrejco et al. ................ 65/3.15 |
| 4,966,433 | 10/1990 | Blonder ............................ 385/49 |
| 5,109,464 | 4/1992 | Munowitz et al. ............... 385/130 |
| 5,179,614 | 1/1993 | Kanamori et al. ............... 385/129 |

FOREIGN PATENT DOCUMENTS

| 61-117513 | 6/1986 | Japan . |
| 53-124006 | 5/1988 | Japan . |
| 63-287806 | 11/1988 | Japan . |
| 64-4710 | 1/1989 | Japan . |
| 1-126608 | 5/1989 | Japan . |
| 2-149805 | 6/1990 | Japan . |
| 2-157805 | 6/1990 | Japan . |
| 4-52606 | 2/1992 | Japan . |

*Primary Examiner*—Rodney B. Bovernick
*Assistant Examiner*—Phan Thi Heartney
*Attorney, Agent, or Firm*—Armstrong, Westerman, Hattori, McLeland & Naughton

[57] ABSTRACT

A method for fabricating a waveguide type optical device is disclosed, through which a core and a reference plane are obtained at the same time by etching a core layer using a thin layer of a predetermined shape formed on the core layer as a mask. In this waveguide type optical device, the core is easily coupled with an optical element such as an optical fiber by means of the reference plane.

14 Claims, 6 Drawing Sheets

WAVEGUIDE TYPE OPTICAL DEVICE AND METHOD FOR MANUFACTURING THE SAME

BACKGROUND OF THE INVENTION

1. Field of the Invention

The present invention relates to a waveguide type optical device and a method for manufacturing the same.

In the field of optical fiber communications, various optical devices, such as optical exchanges, optical multiplexers/demultiplexers, optical switches, and optical couplers, other than optical transmitters and optical receivers, are used. In optical devices of various types, there are those of the waveguide type. The waveguide type optical device is constructed by forming an optical waveguide on a waveguide substrate and, therein, a light beam is adapted to be controlled while it is confined in the optical waveguide. Devices of this type have such merits that they can be easily miniaturized because of their configuration and mass-produced by using planar techniques. Moreover, an electric or magnetic field can be easily applied thereto.

2. Description of the Related Art

Heretofore, in coupling a waveguide type optical device to an optical transmission line, it has been practiced to adjust the position of an optical fiber individually with respect to the exciting end of the optical waveguide and to securely fix the exciting end of the optical waveguide and the optical fiber with an optical binder having a specified index of refraction. Otherwise, having a groove or a pair of protrusions formed on the waveguide substrate, it has been attempted to mount the optical fiber in the groove or between the pair of protrusions to thereby eliminate the need for the positional adjustment of the optical fiber.

When the former of the above described conventional arts is used, there arises a problem that a long time is required for positional adjustment of the optical fiber and complicate work is required for coupling the optical waveguide with the optical fiber. On the other hand, when the latter of the conventional art is used, the thickness of the waveguide layer, for which a groove or a pair of protrusions are provided, tends to vary from product to product on account of difficulties involved in the fabrication technology, and this makes it difficult to achieve accurate coupling of the optical waveguide with the optical fiber. Especially, when a single-mode fiber whose core diameter is 5 to 10 $\mu$m is to be coupled with an optical waveguide, since it is difficult to obtain the thickness of the waveguide layer within a tolerance of 1 $\mu$m while it is required that the positioning accuracy should be within 1 $\mu$m, it is practically impossible to eliminate the need for the positional adjustment in the direction of thickness of the waveguide layer. The coupling loss increases when the optical waveguide and the optical fiber are not accurately coupled. The above problems occur not only when an optical fiber is coupled with an optical waveguide but also when another optical element, such as a light emitting device and a photodetecting device, is coupled with the optical waveguide.

SUMMARY OF THE INVENTION

Accordingly, an object of the present invention is to provide a waveguide type optical device in which the optical waveguide and such an optical element as an optical fiber can be easily and accurately coupled together and a method for fabricating the device.

According to an aspect of the present invention there is provided a method for fabricating a waveguide type optical device comprising the steps of: forming evenly a core layer with a relatively high index of refraction over an under clad with a relatively low index of refraction; forming a first and second thin film layers on the core layer in a core forming region and a reference plane forming region in the vicinity of the core forming region, respectively, the thin film layers having a sufficiently lower etching rate than the etching rate of the core layer; etching the core layer with the first and second thin film layers used as masks; removing the first thin film layer on the core obtained by the etching; forming an outer clad with a relatively low index of refraction of a material having a sufficiently higher etching rate than the etching rate of the second thin film layer so as to cover the core; and partially etching the outer clad to expose at least a part of the second thin film layer serving as a reference plane.

According to another aspect of the present invention, there is provided a waveguide type optical device comprising: an under clad with a relatively low index of refraction; a core with a relatively high index of refraction formed on the under clad; an outer clad with a relatively low index of refraction formed so as to cover the core; and a thin film layer formed in the vicinity of the core on the same plane with the bottom face of the core or on the same plane with the top face of the core; wherein the top face of the thin film layer is exposed to serve as a reference plane.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

A preferred embodiment of the present invention will be described below with reference to the accompanying drawings.

Figure 1:
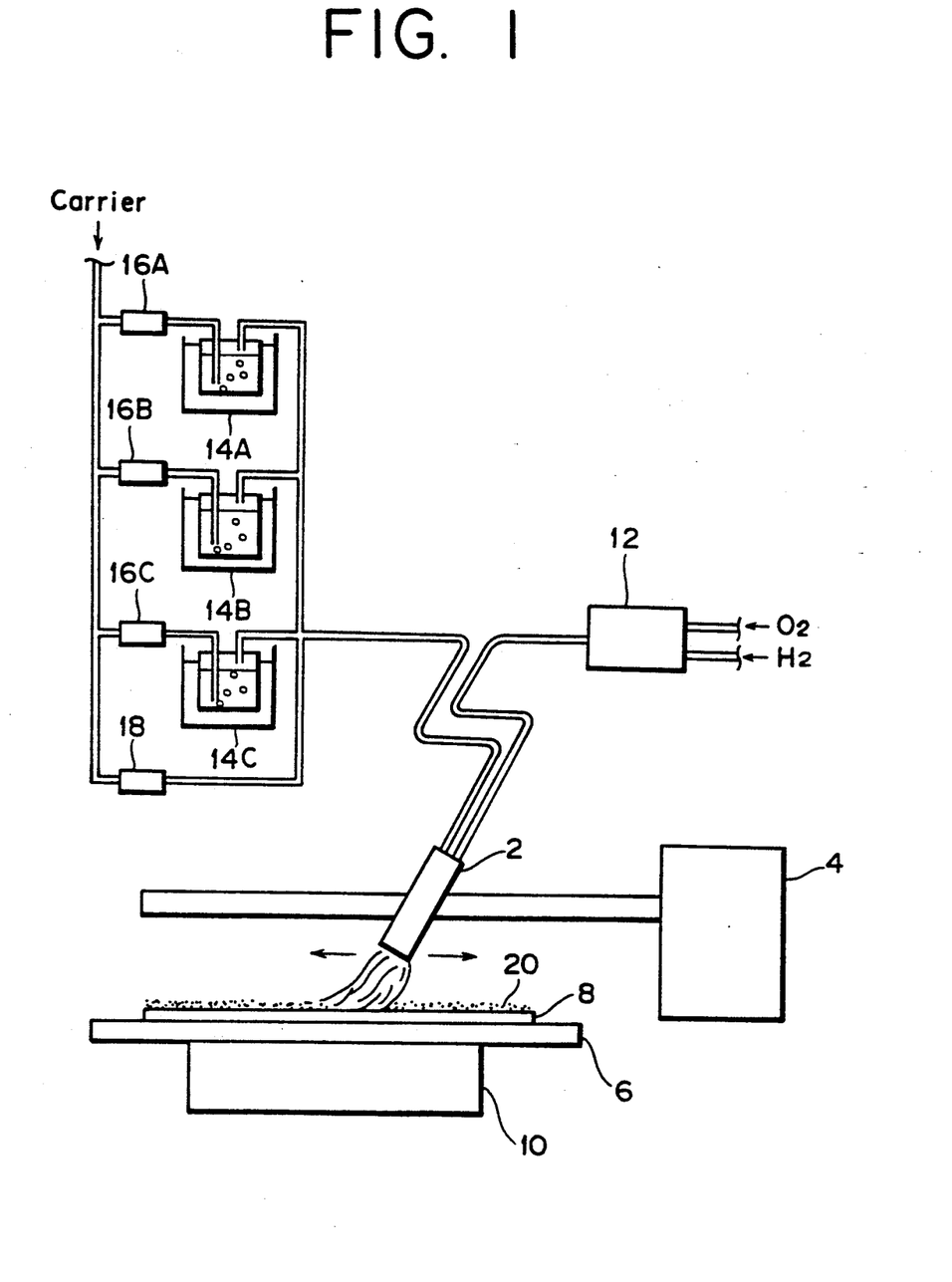
FIG. 1 is a diagram showing a structure of a glass soot precipitating apparatus applicable to a method of the present invention.

FIG. 1 is a diagram showing a structure of a glass soot precipitating apparatus applicable to the method of the present invention.

Reference numeral 2 denotes a burner to which a material gas as well as $O_2$ and $H_2$ for burning are supplied. The burner 2 is driven by an X-axis driver 4 to make reciprocating scanning at a constant velocity (for example 100 mm/sec) in the leftward and rightward directions in the diagram. Reference numeral 6 denotes a stage mounting a substrate 8 thereon. The stage 6 is driven by a Y-axis driver 10 to make reciprocating motion at a constant velocity (for example 1 mm/sec) from the back side to the front side of the paper, and back. As the substrate 8, on which an optical waveguide is formed, a silicon wafer for fabricating a semiconductor, for example, is used. A combustion controller 12 mixes $O_2$ and $H_2$ by a specified mixing ratio and supplies a specified flow of the mixed gas to the burner 2. Material gas suppliers 14A, 14B, and 14C deliver material gases corresponding to the flows of the carrier gas such as $O_2$ fed therein from gas flow meters 16A, 16B, and 16C, respectively. In the present example, material gases such as $SiCl_4$ and $POCl_3$ in liquid phase are filled in the Material gas suppliers 14A, 14B, and 14C. It may also be practiced to use the material gases in vapor phase and directly adjust the flows of the material gases by means of gas flow meters. Reference numeral 18 denotes a gas flow meter for controlling the total flow of the mixed material gas.

The material gas blown off from the burner 2 causes oxides such as $SiO_2$ to be precipitated by flame hydrolysis following the combustion and the oxides are solidly deposited on the substrate 8 as oxide glass soot 20 in the form of white powder. Through the scanning of the burner 2 and the movement of the stage 6, the glass soot 20 is deposited on the substrate 8 in uniform thickness. The glass soot deposited on the substrate 8 is vitrified by being heated in an electric furnace, not shown, or the like and turned into a transparent film used for an optical waveguide.

FIG. 2A to FIG. 2E are explanatory drawings of a fabrication process of a waveguide type optical device according to an embodiment of the present invention.

Figure 2A:
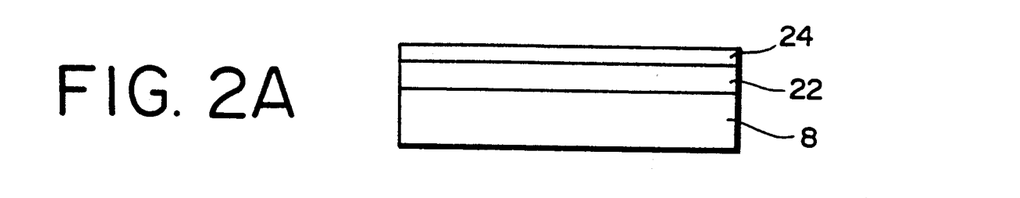
FIG. 2A to FIG. 2E are explanatory drawings of a fabrication process of a waveguide type optical device according to an embodiment of the present invention.
Figure 2B:
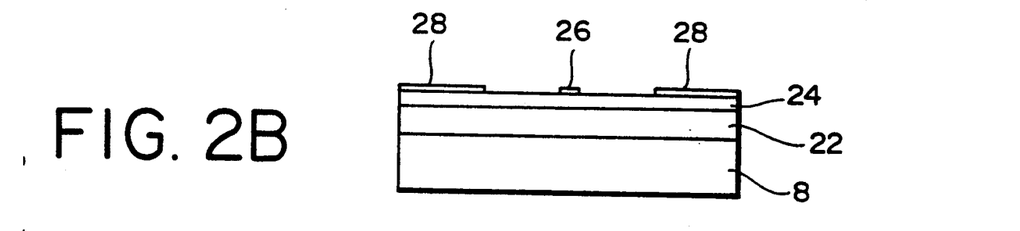

First, as shown in FIG. 2A, an under clad 22 with a lower index of refraction made of $SiO_2$ as the main component doped with $P_2O_5$ and $B_2O_3$ and a core layer 24 with a higher index of refraction made of $SiO_2$ as the main component doped with $GeO_2$ are deposited, in order of mention, on the waveguide substrate 8 made for example of Si by using the apparatus shown in FIG. 1. The difference between relative indexes of refraction of the under clad 22 and the core layer 24 is for example 1%. The thicknesses of the under clad 22 and the core layer 24 are for example 20 $\mu m$ and 6 $\mu m$, respectively. The heating temperature for vitrification is for example 1350° C. Then, as shown in FIG. 2B, a thin film layer 26 for forming the core and thin film layers 28 serving as reference planes are formed on the core layer 24. The thin film layers 26 and 28 are made of Si in this example and they sufficiently achieve their purposes if they have a thickness of 0.5 $\mu m$ or so.

Figure 3:
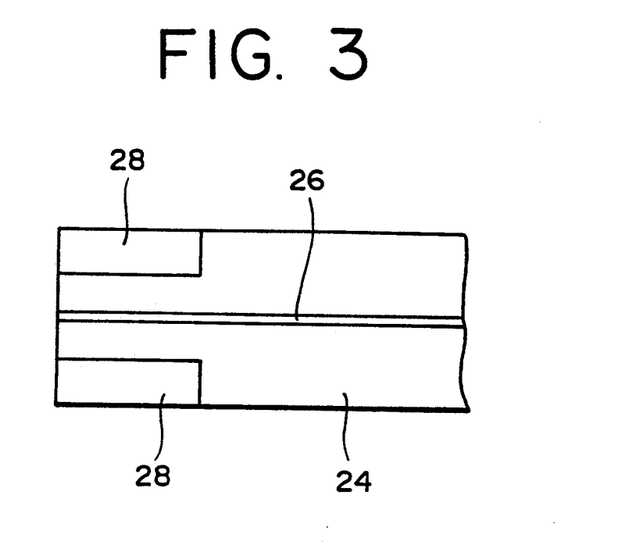
FIG. 3 is a plan view showing a thin film layer in FIG. 2B.

A plan view of the waveguide substrate at this stage is shown in FIG. 3. In the present embodiment, the thin film layer 26 for forming the core is extended to the edge of the waveguide substrate 8, while the thin film layers 28 as the reference planes are provided in the form of two rectangles disposed on both sides of the end portion of the thin film layer 26 for the core formation. Sufficiently high dimensional accuracy of the thin film layers 26 and 28 in the plane can be attained by an ordinary patterning technology.

Figure 2C:
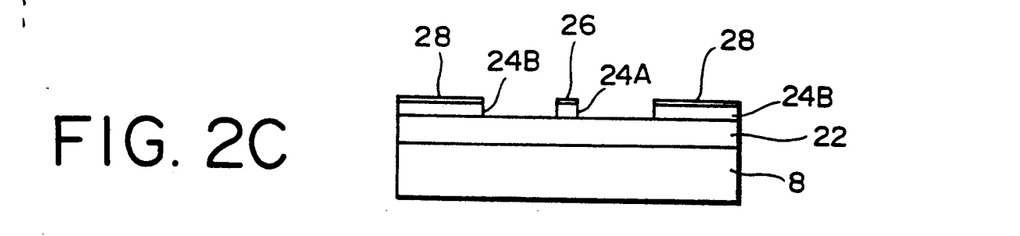
Figure 2D:
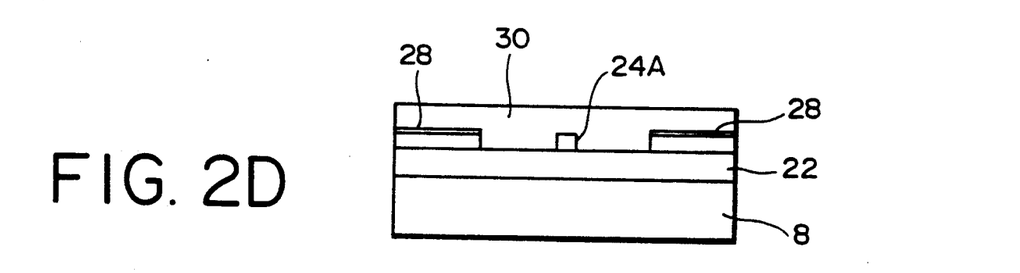
Figure 2E:
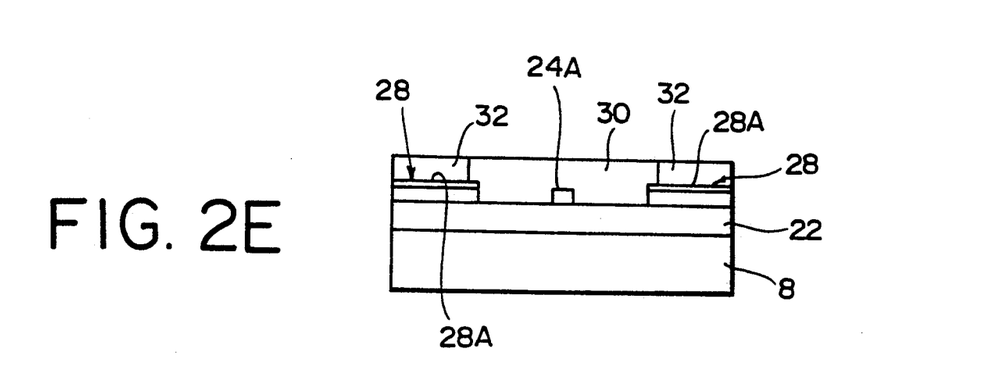

Then, as shown in FIG. 2C, the core layer 24 is subjected to etching with the thin film layers 26 and 28 used as masks. Since the etching rate of the core layer 24 whose main component is $SiO_2$ is sufficiently higher than that of the thin film layers 26 and 28 made of Si, unnecessary portions of the core layer 24 are removed by the etching, and as a result, a core 24A remains intact under the thin film layer 26 and portions of the core layer equally remain intact under the thin film layers 28. Thereafter, the thin film layer 26 over the core 24A is removed and, then, an outer clad 30 is formed over the under clad 22 by using the apparatus shown in FIG. 1 such that the exposed surface of the core 24A is covered by it as shown in FIG. 2D. The composition of the outer clad 30 is so adjusted that its index of refraction becomes equal to the index of refraction of the under clad 22. The thickness of the outer clad 30 is approximately 20 $\mu m$. Further, the outer clad 30 is partly removed by etching using a suitable mask so that the top surfaces of the thin film layer 28 are exposed for serving as the reference planes 28A.

Figure 4:
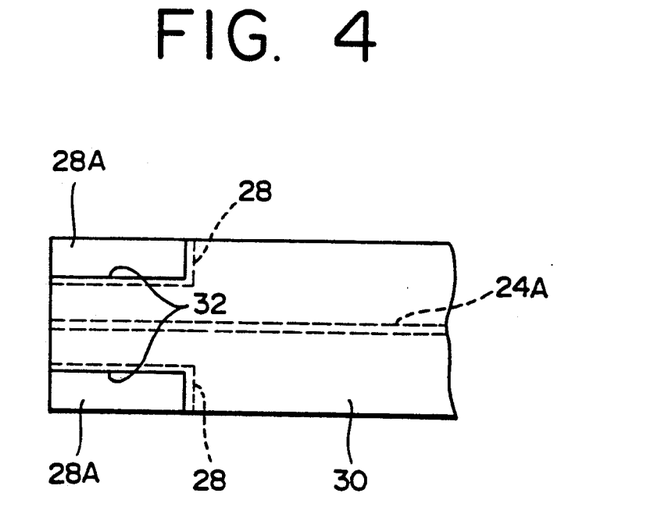
FIG. 4 is a plan view showing reference planes in FIG. 2E.

The plan view of the waveguide substrate at this stage is shown in FIG. 4. Through the above described etching, cutouts 32 are formed on both sides of the core 24A symmetrically about it. The thus formed cutout 32 is provided with a positional accuracy in the plane on the order of sub-microns by an ordinary patterning technology. Meanwhile, the reference plane 28A at the bottom of the cutout 32 in the direction of the thickness of the waveguide layer is virtually on the same level with the top face of the core 24A. The discrepancy between the reference plane 28A and the top face of the core 24A in the direction of the thickness of the waveguide layer corresponds to the thickness of the thin film layer 28. Since the fluctuation in thickness of the thin film layer 28 is less than 0.1 $\mu m$, the reference plane 28A and the core 24A can be easily set in a predetermined relative position.

Figure 5:
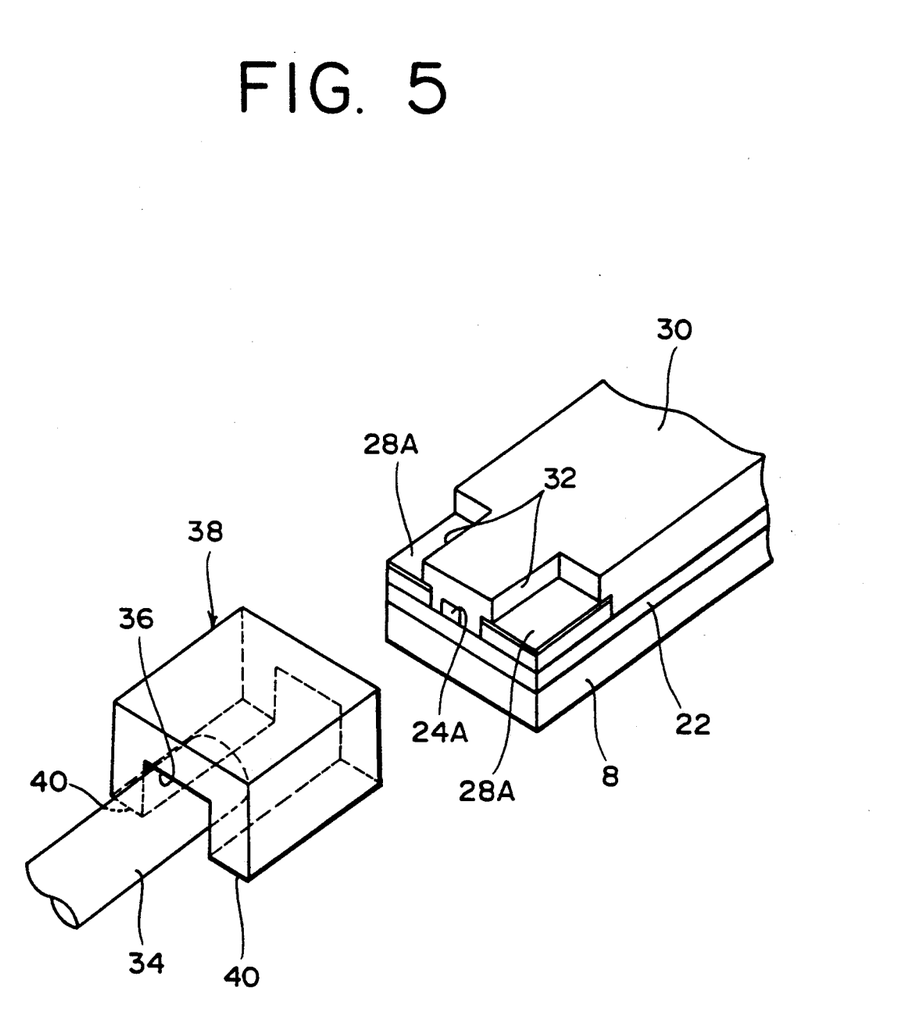
FIG. 5 is an exploded view in perspective of the coupled portion where a core shown in FIG. 2E is coupled with an optical fiber.
Figure 6:
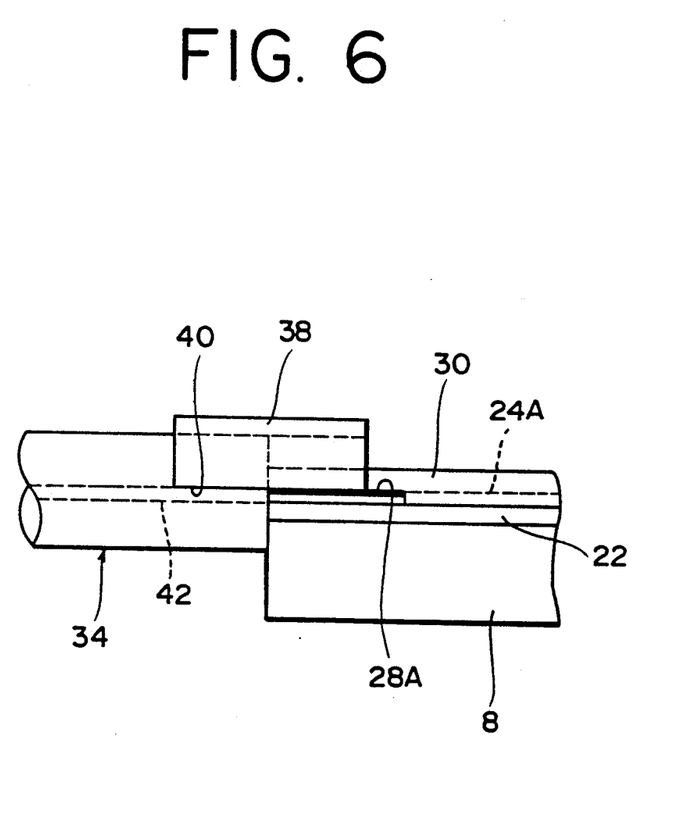
FIG. 6 is a side view of the coupled portion.

The practice to couple the core 24A with an optical fiber will be described with reference to FIG. 5 and FIG. 6. FIG. 5 is an exploded view in perspective of the coupled portion and FIG. 6 is a side view of the coupled portion.

Reference numeral 38 denotes a guide for supporting the optical fiber 34 and this guide 38 is formed of a rectangular parallelepiped block with a groove 36 formed therein to allow the optical fiber 34 to fit in it. Of this guide 38, the outer surface on the side on which the optical fiber 34 is mounted is formed into a plane surface 40. The optical fiber 34 is tightly inserted in the groove 36 to the extent it reaches around the center of the groove 36. The optical fiber 34 is fixed to the guide 38 with a binder. In coupling the optical fiber 34 with the core 24A, the core 42 of the optical fiber 34 must be positioned coaxially with the core 24A in order that a high optical coupling efficiency is obtained. In the present embodiment, the cutouts 32 and the guide 38 are so shaped that the core 24A and the core 42 are coaxially positioned when the guide 38 fits over the end portion of the outer clad 30 where the cutouts 32 are formed with the plane surface 40 thereof held in close contact with the reference plane 28A. In the described manner, the optical fiber 34 and the guide 38 together are mounted on the end portion of the waveguide type optical device and, thereby, mechanical and optical coupling between the optical fiber 34 and the core 24A can be achieved with ease.

When the reference plane is set for example on the waveguide substrate 8 or on the top face of the outer clad 30, the positional fluctuation of the reference plane in the direction of thickness of the waveguide layer due to the fabrication error in thickness of the core layer or the clad layer is considerably large. According to the present embodiment, however, positioning of the optical fiber can be attained without the need for adjustments and with accuracy.

The thin film layer 28 for providing the reference plane may be formed on the plane including the bottom face of the core 24A instead of on the plane including the top face of the core. In so doing, instead of depositing glass soot for the under clad 22 and the core layer 24 in succession in the process shown in FIG. 2A, glass soot for the under clad is first deposited on the waveguide substrate and this glass soot is vitrified so that the under clad is formed, then a thin film layer for providing the reference plane is formed on the under clad, and thereafter the core layer is formed.

Although, in the present embodiment, the optical element to be coupled to the core of the optical waveguide has been supposed to be an optical fiber, the invention is also applicable to the case where the optical element is a light emitting device such as a laser diode and a light emitting diode, a photosensitive device such as a photodiode, or that of the various active/passive optical devices.

At the time when the outer clad 30 is formed by vitrifying oxide glass soot in a high temperature at the step of FIG. 2D, it sometimes occurs that the cross-sectional form of the core 24A deviates from the predetermined cross-sectional form due to the heat then produced. Since the core 24A is doped with GeO$_2$ to raise its index of refraction and its softening temperature is thereby lowered, the core is easily deformed by the heating. Such deformation of the cross-sectional form of the core sometimes causes the structural parameters of the optical waveguide to deviate from previously designed values and thereby required characteristics become unobtainable. For example, when a directional optical coupler is constructed of an optical waveguide, the structural parameters of its optical coupling portion (the portion at which its two cores are closest to each other) deviate from the designed values, and thereby the wavelength dependence of the branching ratio is greatly varied.

A fabricating process of a waveguide type optical device through which the cross-sectional form of the core hardly deforms will be described below with reference to FIG. 7A to FIG. 7D.

Figure 7A:
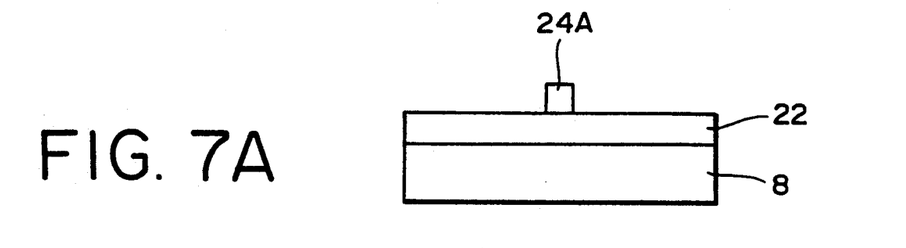
FIG. 7A to FIG. 7D are explanatory drawings of part of a fabrication process of a waveguide optical device according to another embodiment of the present invention.
Figure 7B:
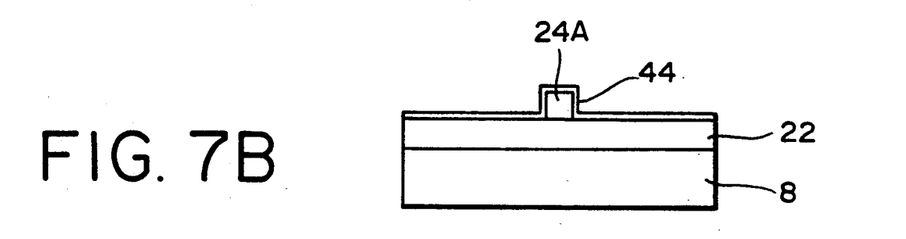

FIG. 7A shows a state where the core 24A is formed on the under clad 22. The state shown therein corresponds to the state of the core 24A in FIG. 2C with the thin film layer 26 thereon removed. The portion relating to the reference plane is not shown. At the step shown in FIG. 7B, an intermediate layer 44 of SiO$_2$ is formed on the under clad 22 so as to cover the core 24A through chemical vapor deposition (CVD) using such a material gas as Si(OC$_2$H$_5$)$_4$ and SiCl$_4$. The CVD is performed by putting the intermediate product shown in FIG. 7A in a reaction furnace through which the material gas is flowing and heating the intermediate product to a temperature of for example around 400° C. It is preferred that the thickness of the intermediate layer 44 is between 0.5 and 2 μm because the intermediate layer 44 cannot suppress the deformation of the core 24A when it is thinner than 0.5 μm and it takes a long time to have the intermediate layer 44 thicker than 2.0 μm deposited.

Figure 7C:
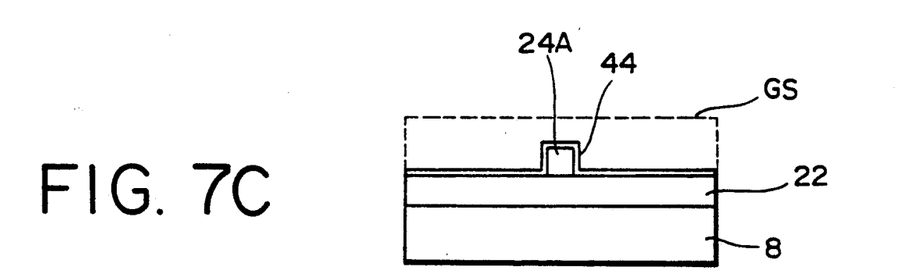
Figure 7D:
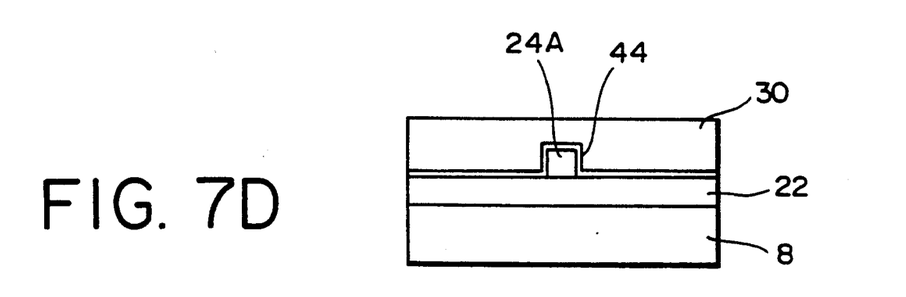

The intermediate layer 44 is annealed in a heating furnace at a temperature for example of 1200° C. Two hours or so are enough as the annealing time. After the annealing, oxide glass soot GS whose main component is SiO$_2$ doped for example with P$_2$O$_5$ and B$_2$O$_3$ is deposited on the intermediate layer 44 as shown in FIG. 7C by using the apparatus shown in FIG. 1 and the layer is vitrified at a heating temperature for example of 1180° C. whereby an outer clad 30 having an index of refraction equal to that of the under clad 22 is formed as shown in FIG. 7D. The annealing temperature is set to be equal to or higher than the heating temperature for vitrifying the oxide glass soot GS.

Since the intermediate layer 44 is formed around the core 24A through the above described process, the core 24A hardly deforms in the course of the vitrification of the oxide glass soot GS at a high temperature. Further, by performing the annealing of the intermediate layer 44 at a temperature equal to or higher than the heating temperature at which the outer clad 30 is formed, substances not reacted and gases in the intermediate layer 44 can be sufficiently discharged. Thereby, bubbles are prevented from being formed in the intermediate layer 44 or at the interface between the intermediate layer 44 and the outer clad 30 during the vitrification of the glass soot GS and the characteristics of the waveguide type optical device can be improved. When a low-temperature CVD at a temperature of around 400° C. is performed, the depositing speed is low, but the productivity of the waveguide type optical device is not thereby hindered because the intermediate layer 44 with an extremely small thickness can sufficiently serve its purpose. By performing the annealing of the intermediate layer 44 under a low pressure or performing it in an atmosphere of He, substances that are not reacted and gases in the intermediate layer 44 can be easily discharged so that the time required for the annealing can be shortened.

When a waveguide type optical device functioning as a directional optical coupler is fabricated through the above described method, the waveguide parameters of the optical coupling portion can be set as designed and, hence, a directional optical coupler with specified characteristics can be easily obtained. It is preferred that only SiO$_2$ be used as the material of the intermediate layer 44 for obtaining it with a high softening temperature, although a suitable amount of dopant necessary for adjusting the index of refraction of the intermediate layer may be added.

While the invention has been described with reference to particular embodiments, these embodiments are given by way of illustration only and not limitative of the present invention. The scope of the invention is defined by the appended claims and all changes and modifications as fall within the equivalence of the scope of the claims are therefore to be embraced by the invention.

What is claimed is:

1. A method for fabricating a waveguide optical device comprising the steps of:

forming evenly a core layer with a relatively high index of refraction upon an under clad with a relatively low index of refraction;

forming a first and second thin film layers upon said core layer in a core forming region and a reference plane forming region in the vicinity of the core forming region, respectively, said thin film layers having a sufficiently lower etching rate than the etching rate of said core layer;

etching said core layer with said first and second thin film layers used as masks, thereby forming a core and a reference plane, respectively;

removing said first thin film layer on the core;

forming an outer clad with a relatively low index of refraction of a material having a sufficiently higher etching rate than the etching rate of said second thin film layer so as to cover at least said core; and partially etching said outer clad to expose at least a part of said reference plane.

2. A method according to claim 1, wherein said under clad, said core layer, and said outer clad are formed by heating and vitrifying oxide glass soot whose main component is $SiO_2$ precipitated by flame hydrolysis; and said first and second thin film layers are formed by sputtering of Si.

3. A method according to claim 2, further comprising the steps of:

forming an intermediate layer whose main component is $SiO_2$ between said core and said outer clad by chemical vapor deposition; and annealing said intermediate layer by heating the same.

4. A method according to claim 3, wherein said intermediate layer has a thickness within the range from 0.5 to 2 μm.

5. A method according to claim 3, wherein the material gas used in said chemical vapor deposition contains $Si(OC_2H_5)_4$.

6. A method according to claim 3, wherein said annealing is performed at a temperature equal to or higher than the heating temperature at which said outer clad is formed.

7. A method according to claim 3, wherein said annealing is performed under a low pressure or in an He atmosphere.

8. A method according to claim 3, wherein said core constitutes an optical coupling portion of a directional optical coupler.

9. A method according to claim 2, wherein said under clad is formed on a Si substrate.

10. A method according to claim 1, further comprising the steps of:

fixing an optical element to a guide of a predetermined form having a plane surface to be brought into close contact with said reference plane; and optically coupling said optical element to said core while said plane surface is in close contact with said reference plane; wherein said guide is so formed that the optical axis of said optical element aligns with the optical axis of said core when said plane surface is in close contact with said reference plane.

11. A method according to claim 10, wherein said optical element is an optical fiber.

12. A method according to claim 1, wherein two of said second thin film layers are formed on both sides of said first thin film layer so as to face each other across said first thin film layer.

13. A waveguide optical device comprising:

an under clad with a relatively low index of refraction;

a core with a relatively high index of refraction formed on said under clad;

an outer clad with a relatively low index of refraction formed so as to cover said core; and a thin film layer formed in the vicinity of said core on the same plane with the bottom face of said core or on the same plane with the top face of said core; wherein the top face of said thin film layer is exposed to serve as a reference plane.

14. A waveguide optical device according to claim 13 wherein the main component of said under clad, said core, and said outer clad is $SiO_2$ and the material of said thin film layer is Si.

* * * * *